(12) United States Patent
Hsu

(10) Patent No.: US 7,328,354 B2
(45) Date of Patent: Feb. 5, 2008

(54) APPARATUS AND METHOD FOR REAL-TIME ADJUSTING SYSTEM PERFORMANCE OF A COMPUTER

(75) Inventor: Hsien-Yueh Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 406 days.

(21) Appl. No.: 10/823,537

(22) Filed: Apr. 14, 2004

(65) Prior Publication Data

US 2004/0210782 A1 Oct. 21, 2004

(30) Foreign Application Priority Data

Apr. 15, 2003 (TW) .............................. 92108712 A

(51) Int. Cl.
*G06F 1/00* (2006.01)
(52) U.S. Cl. ...................................... 713/300; 711/148
(58) Field of Classification Search ................ 713/300; 711/146
See application file for complete search history.

(56) References Cited

U.S. PATENT DOCUMENTS

| | | | | |
|---|---|---|---|---|
| 5,189,314 A | * | 2/1993 | Georgiou et al. ........... 327/114 |
| 5,546,591 A | * | 8/1996 | Wurzburg et al. .......... 713/322 |
| 5,585,750 A | * | 12/1996 | Noguchi et al. ............. 327/113 |
| 5,596,756 A | * | 1/1997 | O'Brien ..................... 713/340 |
| 5,715,467 A | * | 2/1998 | Jirgal ......................... 713/300 |
| 5,719,800 A | * | 2/1998 | Mittal et al. ................. 713/321 |
| 5,781,783 A | * | 7/1998 | Gunther et al. ............. 713/320 |
| 5,884,088 A | * | 3/1999 | Kardach et al. ............. 713/324 |
| 5,987,614 A | * | 11/1999 | Mitchell et al. ............. 713/300 |
| 6,073,244 A | * | 6/2000 | Iwazaki ....................... 713/322 |
| 6,079,022 A | * | 6/2000 | Young ........................ 713/300 |
| 6,085,325 A | * | 7/2000 | Jackson et al. ............. 713/300 |
| 6,374,367 B1 | * | 4/2002 | Dean et al. .................... 714/37 |
| 6,574,739 B1 | * | 6/2003 | Kung et al. ................. 713/322 |
| 6,728,890 B1 | * | 4/2004 | Mirov et al. ................. 713/300 |
| 6,813,674 B1 | * | 11/2004 | Velasco et al. ............. 710/311 |
| 6,895,520 B1 | * | 5/2005 | Altmejd et al. ............. 713/324 |
| 6,915,518 B1 | * | 7/2005 | Jacobson ..................... 718/104 |
| 6,976,182 B1 | * | 12/2005 | Filippo ........................ 713/324 |
| 7,003,685 B2 | * | 2/2006 | Oh .............................. 713/600 |
| 2003/0229816 A1 | * | 12/2003 | Meynard ..................... 713/600 |
| 2004/0044770 A1 | * | 3/2004 | Messick et al. ............. 709/226 |
| 2005/0044429 A1 | * | 2/2005 | Gaskins et al. ............. 713/300 |

* cited by examiner

*Primary Examiner*—Thomas Lee
*Assistant Examiner*—Vincent T Tran
(74) *Attorney, Agent, or Firm*—Birch, Stewart, Kolasch & Birch, LLP

(57) ABSTRACT

An apparatus for adjusting system performance of computer is fabricated on a motherboard. The apparatus comprises a plurality of performance monitor means and a performance control chip. The performance monitor means are connected separately to bus lines which are applied to connect devices mounted on the motherboard, for monitoring the operating state of each device according to the flow rate of data transferred in the bus lines. The performance control chip is connected separately to the devices, for adjusting the operating rate of the devices responsive to the performance monitor means. The performance control chip is capable of ascertaining the operating rate of each device is busy or not, so as to increasing or decreasing the operating rate of the device.

13 Claims, 2 Drawing Sheets

APPARATUS AND METHOD FOR REAL-TIME ADJUSTING SYSTEM PERFORMANCE OF A COMPUTER

This Non-provisional application claims priority under 35 U.S.C. § 119(a) on Ppatent Application No(s). 092108712 filed in Taiwan on Apr. 15, 2003, the entire contents of which are hereby incorporated by reference.

FIELD OF THE INVENTION

The present invention relates to an apparatus for real-time adjusting the system performance of a computer, and more particularly, to an apparatus fabricated on the motherboard of the computer for monitoring the operating state of each device on the motherboard and automatically adjusting power sources supplied to the device, to optimize the system performance.

BACKGROUND OF THE INVENTION

With the continuing advances and developments of electrical manufactures, the multimedia computers in new generation with high image and audio quality are widely used and more popular. The expenditure enhancement for computers also causes the popularization and vigorous development of related industry. As well known, the system performance of a computer is decided mainly by the motherboard and those devices, such as CPU, RAM, chip sets, etc., fabricated thereon.

For instance, the new generation of CPU has more fine and complicated internal frame fabricated so as to provide higher operating frequency and multiple powerful computing functions. And the new generation of PC133 and PC150 DRAMs are introduced to promote the ability to deal with multi-media data of personal computers due to its enlarged memory space. Except for the CPU and memory, other devices, such as south and north bridge chips, AGP cards, net cards, and modem cards, are manufactured with more complicated structures and powerful functions, to satisfy the requirements of consumers.

However, for the various devices with the more complicated structures therein, how to integrate effectively these devices for further promoting system performance has become an important issue. Actually, when a computer system is operated, the devices on the motherboard usually have different loadings. For example, when the executing program needs a large number of computing procedures, the CPU will be involved in a busy state; and when the executing program centers on transferring and processing of graphical data, the AGP card will be kept in a busy state.

Namely, when a program is executed, sometimes the CPU or memory device is busy, sometimes the peripheral devices mounted on the PCI slots are busy, and sometimes for a lot of devices there is nothing to handle. Therefore, if the all devices can be integrated effectively and the system source such as power or bandwidth can be allotted to these devices according to their actual operating states, the system performance of the computer will be further promoted. For instance, if the task of executed programs centers on the operation of the memory device, the source supplied to the memory device can be increased; and if there is nothing to deal with for the CPU, the operating rate of the CPU can be slowed down so as to reduce power consumption and promote system performance.

Though in current producing lines, the manufacturers usually preset the operating rate and voltage of each device and predetermine the optimal parameters of system performance according to experiences and trade-off. However, when the computer is in operation, the constant optimal parameters can not be real-time adjusted to have the system source redeployed basing the operating state of each device. Hence, in practice, the preset priority for each device to share the source is usually different with the actual need of the computer system according to the real operating state of each device. In other words, the system performance can not be real-time optimized to fit with in the actual condition. And the computer system will consume more power and reduce the lifetime of devices.

SUMMARY OF THE INVENTION

It is therefore an objective of the present invention to provide a real-time adjusting apparatus fabricated on the motherboard of the computer, to monitor and adjust the operating state of each device for optimizing the system performance.

The apparatus comprises a plurality of performance monitor means and a performance control chip. The performance monitor means are connected separately to the corresponding one of bus lines applied to connect devices mounted on the motherboard, for monitoring the operating state of each device. The performance control chip is connected separately to the devices and responsive to the signals from the performance monitor means, so as to ascertain the operating rate of each device is busy or not and to adjust the operating rate of the devices.

The data flow rate can be the data access times or commands passing through the bus line per unit time. And, the bus lines comprise a PCI bus line connected between a south bridge chip and PCI slots, an AGP bus line connected between a north bridge chip and an AGP slot, a memory bus line connected between the north bridge chip and a memory device, and a CPU bus line connected between a CPU and the north bridge chip. Besides, the devices connected with the performance control chip comprise the CPU, the north bridge chip, the south bridge chip, the AGP slot, the PCI slots and motherboard power supply.

BRIEF DESCRIPTION OF THE DRAWINGS

The invention can be more fully understood by reading the following detailed description of the preferred embodiments, with reference made to the accompanying drawings, wherein.

DETAILED DESCRIPTION OF THE PREFERRED EMBODIMENT

Figure 1:
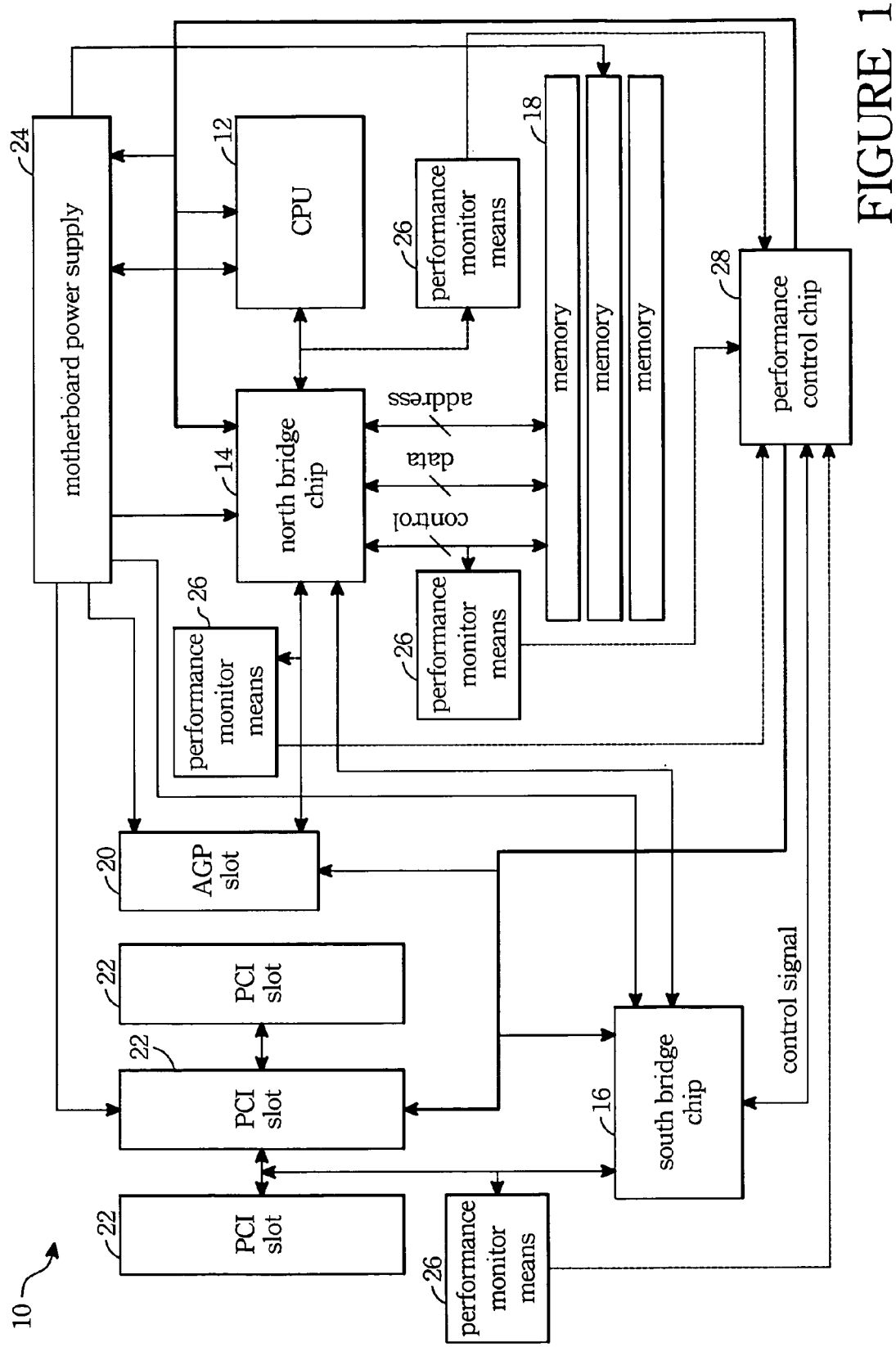
FIG. 1 is a schematic view showing the adjusting apparatus fabricated on the motherboard.
Figure 2:
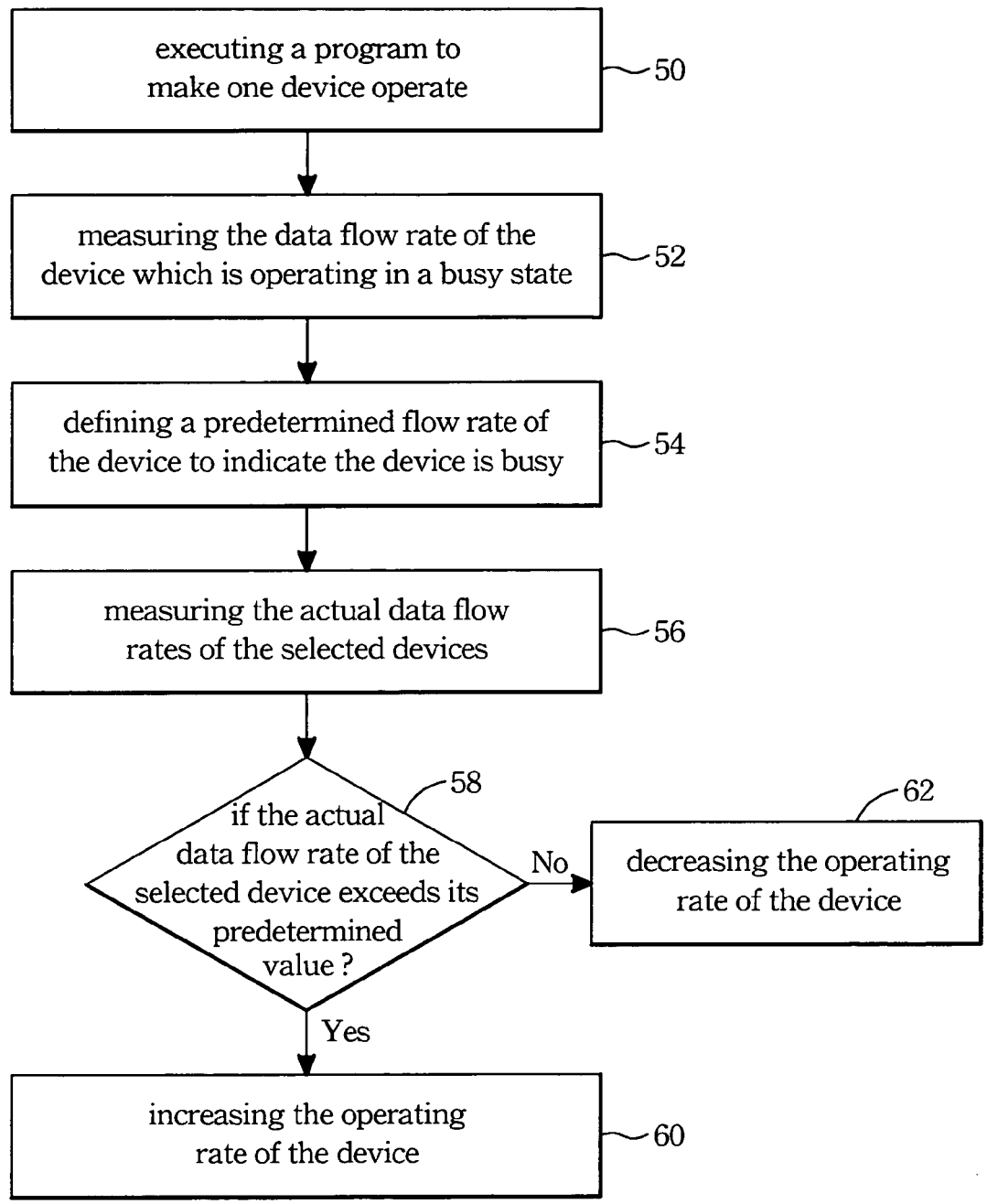
FIG. 2 is a flow chart showing the method for adjusting the system performance of the computer according to the present invention.

Please refer to FIG. 1, the motherboard 10 provided by the present invention is illustrated. As shown in the FIGURE, the devices fabricated on the motherboard 10 comprise a CPU 12, a north bridge chip 14 and a south bridge chip 16. The CPU 12 is used to execute various computing functions of the computer system. As to the north bridge chip 14 and the south bridge chip 16 are applied to transfer commands from the CPU 12 to other devices on the motherboard 10 for executing, or to send messages from various device back to the CPU 12.

The devices fabricated on the motherboard 10 further comprise a memory 18, an AGP slot 20, three pieces of PCI slots 22 and a motherboard power supply 24. The memory 18 is fabricated below the north bridge chip 14 for storing the data and programs in use of the computer system, The AGP slot 20 is applied to mount an AGP card thereon so as to handle image data fast and perfectly. As to the PCI slots 22 can be used to connect some extra peripheral devices such as net cards, modem cards, and so on. Besides, the motherboard power supply 24 above the north bridge chip 14 and the CPU 12 is applied to provide electrical power to each device on the motherboard 10. A large number of bus lines are also fabricated on the motherboard 10 for connecting those devices and slots.

For real-time monitoring the operating state of each device on the motherboard and optimally allotting whole system source to supply the devices, an apparatus for automatically adjusting the system performance disclosed by the present invention is fabricated on the motherboard 10. This apparatus, as shown in FIG. 1, comprises a plurality of performance monitor means 26 and a performance control chip 28. Each performance monitor means 26 is connected to one selected bus line, so as to monitor the operating state of the device which is connected to the selected bus line by counting the actual flow rate of data transferred through the selected bus line. In general, the data access cycles or commands transferred through the selected bus line per unit time can be introduced to show the operating state of the selected device.

For example, a performance monitor means 26 is connected to the bus line which is applied to connect the south bridge chip 16 and the PCI slot 22, so as to monitor the actual data flow rate through this bus line for ascertaining the operating state of the peripheral device mounted on the PCI slot 22; or a performance monitor means 26 is connected to the bus line between the north bridge chip 14 and the AGP slot 20 for monitoring the actual operating state of the AGP card. Similarly, another performance monitor means 26 can be connected to the memory bus line between the north bridge chip 14 and the memory 18 for monitoring the actual flow rate there through, or can be connected to the CPU bus line between the CPU 12 and the north bridge chip 14 to monitor the operating state of the CPU 12.

As to the performance control chip 28 is connected separately to each device on the motherboard 10, to compare the operating state of each device according to the flow rate provided by the performance monitor means 26. Then, the performance control chip 28 can redeploy the system source shared by each device, to adjust the operating rate of each device for promoting the whole system performance of the motherboard 10. As shown in FIG. 1, the performance control chip 28 is connected to each performance monitor means 26 via circuits defined on the motherboard 10 to receive the data flow rate of the selected device. Besides, the performance control chip 28 is also connected individually to the CPU 12, the north bridge chip 14, the south bridge chip 16, the AGP slot 20, the PCI slot 22 and the power supply 24 via the bus lines, for comparing and ascertaining the operating state of each device according to the information provided by the performance monitor means 26, and then real-time performing the adjustments.

In a preferred embodiment, the performance monitor means 26 comprises a counter for counting the number of times of transferring commands or accessing data through one selected bus line per unit time. For instance, when the unit time is set to be 100 ms, then the performance monitor means 26 can measure the flow times in the period of 100 ms, and send the flow rate to the performance control chip 28. As to the performance control chip 28 comprises a comparator and a register. The comparator can compare the actual flow rate provided by the performance monitor means 26 with the predetermined value stored in the register. When the flow rate of one selected device on the motherboard 10 exceeds its predetermined value, the selected device will be ascertained to be in a busy state. For example, if the predetermined value of one peripheral device mounted on the PCI slot is set to be 3000 times per 100 ms, this device will be ascertained to be busy when its flow rate measured by the performance monitor device 26 is higher than 3000 times/100 ms.

After deciding the operating state of each device on the motherboard, the performance control chip 28 will send control signals via a timing control circuit to adjust the operating rate of each device. Namely, the operating rate of each device can be altered by adjusting the clock signals of the device. When one device is in the busy state, the clock signal of this device will be adjusted to increase its operating rate; on the contrary, when the actual flow rate of the device is below the predetermined value stored in the register of the performance control chip 28, the device will be ascertained to be not busy, thereby adjusting its clock signal to lower operating rate.

Besides, the performance control chip 28 can also send control signals to the north bridge chip 14 or the south bridge chip 16, to alter default configurations stored in the register of the north bridge chip 14 or the south bridge chip 16, for readjusting the priority of each device to share the system source. Generally, according to the default configurations set at the time the motherboard is manufactured, the priority of the device to share the system source has the sequence of CPU (1st)→AGP card (2nd) → peripheral devices mounted on the PCI slots (3rd). However, by introducing the apparatus for adjusting the system performance disclosed by the present invention, the sequence of the priority to share the system source can be readjusted according to the flow rates of the devices measured by the performance monitor means 26. For instance, when the AGP card is busy and the CPU is not busy, the performance control chip 28 will promote the priority of the AGP device, thereby providing more system source for the AGP device.

Except readjusting the priority sequence of devices on the motherboard, the performance control chip 28 can also redistribute the system source by adjusting the bandwidth of each device. For example, when one device is busy, the performance control chip 28 will send a control signal to increase the data access cycles per unit time of the device. By resetting the bandwidth of each device on the motherboard, the operating rate of the device in the busy state can be increased by providing more system source, while the operating rate of the device which is not busy can be decreased by reducing the system source supplied thereto.

Besides, the computer system also can be optimized by adjusting the power supplied to each device because the performance control chip 28 is connected to the motherboard power supply 24. For example, when one device is busy, the voltage applied to this device can be increased under the specification to promote the operating rate of the device. On the other hand, when some device is not busy, the operating voltage applied to the device can be decreased to lower its operating rate. Thus, the whole system power can be used more effectively, so as to reduce power consumption and prolong the lifetime of devices.

The present invention also provides a method for automatically adjusting the computer system. As shown in FIG.

2, the flow chart according to the method is illustrated as follows: (1) executing a program to make one selected device operate in a busy state (step 50); (2) measuring the data flow rate of the selected device in the busy state (step 52); (3) defining a predetermined flow rate of the selected device to indicate the selected device is busy (step 54) and storing the predetermined values in the register of the performance control chip 28; (4) repeating the above steps (1)~(3) to define the predetermined flow rates of all devices fabricated on the motherboard; (5) after determining the default flow rates of all devices, measuring the actual data flow rates of selected devices on the motherboard (step 56); (6) when the actual data flow rate of one selected device exceeds its predetermined value (step 58), promoting the operating rate of the device (step 60); (7) on the contrary, when the data flow rate of the device is less than its predetermined value, reducing the operating rate of the device (step 60).

The present invention has considerable advantages: (1) by introducing the performance monitor means for monitoring each device on the motherboard, the system source can be real-time redeployed according to the operating state of each device, thereby optimizing the whole system performance of the computer; (2) the computer system can automatically adjust the operating rate of each device according to requirement of the executed program, so the operating rate of the device which is not busy can be lowered, thereby reducing the operating noise of the computer and decreasing the power consumption; (3) because the computer system can real-time optimize the allotment of the system source, the computer system will has better operation efficiency; (4) and when the computer system is under lower loading condition, the power source can be saved in advance.

The invention has been described using exemplary preferred embodiments. However, it is to be understood that the scope of the invention is not limited to the disclosed embodiments. On the contrary, it is intended to cover various modifications aid similar arrangements. The scope of the claims, therefore, should be accorded the broadest interpretation so as to encompass all such modifications and similar arrangements.

What is claimed is:

1. An apparatus for adjusting the system performance of a computer, fabricated on a motherboard, said apparatus comprising:
    a plurality of performance monitor means, connected respectively to bus lines which are connected with devices mounted on said motherboard, for monitoring the operating state of each said device according to the flow rate of data transferred in said bus lines; and
    a performance control chip, connected separately to said devices, for adjusting the operating rate of said devices responsive to said performance monitor means, said performance control chip being capable of ascertaining the operating state of each said device is busy or not, so as to increasing or decreasing the operating state of said device, and redeploy whole system resource shared by all devices by comparing the operating state of each said device.

2. The apparatus according to claim 1, wherein said bus lines comprise:
    a PCI bus line, connected between a south bridge chip and a PCI slot;
    an AGP bus line, connected between a north bridge chip and an AGP slot;
    a RAM bus line, connected between said north bridge chip and a RAM device; and
    a CPU bus line, connected between a CPU and said north bridge chip.

3. The apparatus according to claim 1, wherein said devices connected to said performance control chip comprise a CPU, a north bridge chip, a south bridge chip, an AGP slot, PCI slots and a motherboard power supply.

4. The apparatus according to claim 1, wherein said performance monitor means comprises a counter, for measuring the number of times of transferring commands or accessing data through one selected said bus line per unit time.

5. The apparatus according to claim 1, wherein said performance control chip comprises:
    a register, for storing predetermined flow rates of said devices;
    a comparator, for comparing actual flow rates provided by said performance monitor means with said predetermined flow rates stored in said register, when said actual flow rate of one selected said device exceeds said predetermined flow rate thereof, said device is ascertained to he busy.

6. The apparatus according to claim 1, wherein said performance control chip is connected to a motherboard power supply on said motherboard and is capable of controlling said operating rate of each said device by adjusting the power supplied thereto.

7. An apparatus for adjusting the system performance of a computer, fabricated on a motherboard, said apparatus comprising:
    a plurality of counters, coupled respectively to the corresponding one of bus lines which are connected with devices, for measuring the flow rate of data transferred in each said bus line per unit time; and
    a performance control chip, connected separately to said devices, being capable of ascertaining each said device is busy or not, so as to increasing or decreasing the operating rate of said device, and redeploy whole system resource shared by all said devices by comparing the state of each said device, said performance control chip comprising
    a register, for storing predetermined flow rates of said devices;
    a comparator, for comparing actual flow rates measured by said counter with said predetermined flow rate stored in said register, when said actual flow rate of one said device exceeds said predetermined flow rate thereof, said device is ascertained to be busy.

8. The apparatus according to claim 7, wherein said bus lines comprise:
    a PCI bus line, connected between a south bridge chip and a PCI slot;
    an AGP bus line, connected between a north bridge chip and an AGP slot;
    a RAM bus line, connected between said north bridge chip and a RAM device; and
    a CPU bus line, connected between a CPU and said north bridge chip.

9. The apparatus according to claim 7, wherein said devices connected to said performance control chip comprise a CPU, a north bridge chip, a south bridge chip, an AGP slot, PCI slots and a motherboard power supply.

10. A method for adjusting the system performance of a computer, for monitoring the actual data flow rates of devices fabricated on a motherboard and adjusting the operating rates of said devices, said method comprising the steps of:

(1) executing a program to make one selected said device be in an operating state;
(2) measuring a flow rate of data of said selected device in said operating state;
(3) defining a predetermined flow rate of said selected device according to said flow rate of data measured in said step (2) to indicate said selected device is in a busy state;
repeating said steps (1)~(3) to define the predetermined flow rates of said devices fabricated on said motherboard;
measuring actual data flow rates of said devices on said motherboard;
when said actual data flow rate of one said device exceeds said predetermined flow rate thereof, promoting an operating rate of said device;
when said actual data flow rate of said device is less than said predetermined flow rate thereof, reducing the operating rate of said device; and
ascertaining operating sates off all said devices;
comparing the operating states of all said devices; and
redeploying whole system resource shared by all said device.

11. The method according the claim 10, wherein said flow rate of data is the number of times of accessing data passing through said device per unit time.

12. The method according the claim 10, wherein said flow rate of data is the number of times of transferring commands through said device per unit time.

13. The method according the claim 10, wherein said devices on said motherboard comprise a CPU, a north bridge chip, a south bridge chip, an AGP slot, a PCI slot and a motherboard power supply.

* * * * *